United States Patent [19]
Gould et al.

[11] 3,849,238
[45] Nov. 19, 1974

[54] ARTIFICIAL SKIN

[76] Inventors: Francis E. Gould, 29 Cedar Ln.;
Samuel H. Ronel, 84 Deerpath, both of Princeton, N.J. 08540

[22] Filed: Apr. 7, 1972

[21] Appl. No.: 242,162

[52] U.S. Cl............ 161/159, 161/166, 128/132 D, 128/156, 128/268
[51] Int. Cl............................ C09j 7/02, B32b 3/26
[58] Field of Search.................. 161/160, 166, 159; 128/156, 132 D, 268

[56] References Cited
UNITED STATES PATENTS

| | | |
|---|---|---|
| 3,665,918 | 5/1972 | Lindquist et al.................. 128/156 |
| 2,976,576 | 3/1961 | Wichterle et al..................... 264/49 |
| 3,520,949 | 7/1970 | Shepherd et al............ 128/156 UX |
| 3,645,835 | 2/1972 | Hodgson.......................... 128/132 D |
| 3,648,692 | 3/1972 | Wheeler.............................. 128/156 |
| 3,663,462 | 5/1972 | Arndt et al. ........................ 161/159 |
| 3,668,050 | 6/1972 | Donnelly.......................... 161/16 D |

*Primary Examiner*—William J. Van Balen
*Attorney, Agent, or Firm*—Cushman, Darby & Cushman

[57] ABSTRACT

An artificial skin is prepared comprising a water-containing hydrophilic polymer sponge layer and a thinner non hydrophilic polymer layer which is moisture vapor permeable and gas permeable.

16 Claims, 1 Drawing Figure

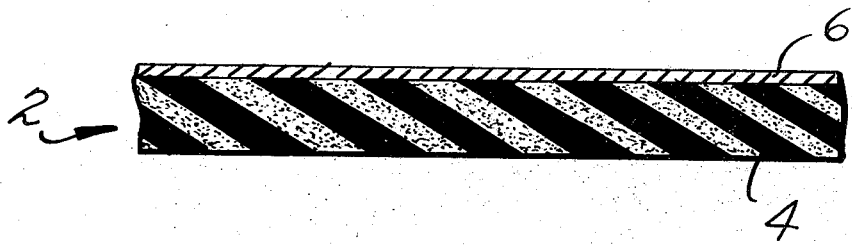

ARTIFICIAL SKIN

The present invention relates to the preparation of a hydrophilic moisture vapor permeable, gas permeable artificial skin compound of a layer of hydrophilic water insoluble polymer sponge, preferably a hydrophilic, water insoluble hydroxy lower alkyl acrylate or methacrylate polymer sponge, most preferably a hydroxyethyl methacrylate polymer sponge covered by laminating or solvent coating a layer of high moisture vapor permeable, gas permeable non-hydrophilic polymer, e.g. a lower alkoxy lower alkyl acrylate or methacrylate polymer, preferably a copolymer of methoxyethyl methacrylate and ethoxyethyl methacrylate (e.g. 40:60 to 60:40).

The purpose of the sponge material, is to allow biofixation (fibrous in growth) and the purpose of the non-hydrophilic layer is to regulate the rate of evaporation of water from the newly generated tissue to approach that of normal skin. The sponge layer can be reinforced with fibers, e.g. fibers of polyethylene, polypropylene, polyester, e.g., polyethylene terephthalate (Dacron) and poly(cyclohexane dimethylene terephthalate), polytetrafluroethylene, glass, nylon (e.g. nylon 6, nylon 6,6, nylon 6,10).

The composite of the hydrophilic polymer sponge and the non-hydrophilic moisture vapor permeable, gas permeable polymer preferably should have a moisture vapor transmission of 200-5,000 grams /sq.meter/24 hours/40° C/80 percent relative humidity/mil (0.0254 mm) and preferably should have an oxygen and carbon dioxide transmission of 500 to 6,000 ml/sq.m/24 hours/400° C./at 1 atm/mil and is usually not over 3,000 ml/sq.m/24 hrs/40° C./1 atm/mil.

The desired moisture vapor transmission and oxygen and carbon dioxide gas transmission rates can be obtained by increasing or decreasing the thickness of the non-hydrophilic polymer layer.

If the hydrophilic polymer sponge is applied to a wound without a coating of the non-hydrophilic polymer, there is a constant evaporation and loss of water and the membrane hardens. The coating affords good protection, permeability to gas and to a lesser extent to water. The non-hydrophilic polymer upper layer is generally elastomeric and is thin (e.g. it is not over 1/10th the thickness of the sponge) and strong and is preferably 0.5 – 1.5 mil (0.0127–0.0381 mm), but may be up to 2.5 mils. The hydrophilic sponge layer is usually about 25 – 50 mils (0.04 – 0.08 mm). The sponge layer is usually substantially saturated with water and is swollen to about 10 to 500 percent above its dimensions in the dry state, preferably 15 to 100 percent.

The new artificial skin can be applied directly to the wound and can be used for humans an other mammals, e.g. cats, dogs, sheep, cattle, monkeys, horses, goats, rates, hamsters, guinea pigs, rabbits.

As stated there is prepared a hydrophilic-hydrophobic moisture vapor permeable, gas permeable aritificial skin capable of being infiltrated by a normal, healthy fibrous ingrowth of cellular tissue for application to denuded, burned, etc., areas to replace skin and deep tissues where it has heretofore been difficult to supply grafts.

More specifically, there is prepared a hydrophilic-hydrophobic system which is fabricated via the use of a hydrophilic sponge which is laminated to, or coated by a skin or non-hydrophilic polymer system to result in a fabricated material that will maintain a desired moisture vapor transmission rate and a gas permeability rate concomitant with that of normal skin.

Such a system can be fabricated to result in a reinforced as well as a non-reinforced device to allow surgical fixation as desired; said reinforcement lying in the sponge portion or in the coated film portion of the device. Typical reinforcements are set forth supra.

Further the bioacceptability of this polymer system, based upon the hydrophilic polymer portion, allows that good capillary invasion also stimulates into the sponge to nutritionally support the cellular ingrowth and such materials of this structure will adapt in such a way as to not create a hyper or hypothermal condition as arises from other nonpermeable, non hydrophilic polymers.

It is noteworthy that this sponge system, unlike other sponges, (e.g. Ivalon (polyvinyl acetal), polyurethane, etc.) does not rigidify with age and therefore results in a permanently flexible system.

It has been discovered that polymeric sponge materials prepared from hydroxy lower alkyl acrylates and methacrylates, are very active in stimulating fibrous tissue ingrowth, the preferred being prepared from hydroxyethyl methacrylate homopolymerized or copolymerized with monomers such as acrylic acid, methacrylic acid, maleic acid, fumaric acid, itaconic acid, aconitic acid, cinnamic acid, crotonic acid, carboxylic acid, propiolic acid, citraconic acid, vinyl sulfonic acid, p-vinylbenzenesulfonic acid, partial ester such as mono-2-hydroxyethyl itaconate, mono-2-hydroxypropyl citraconate, mono-2-hydroxyethyl maleate, mono-2-hydroxypropyl fumarate, monomethyl itaconate, monoethyl itaconate, monomethyl cellosolve itaconate (Methyl Cellosolve is the monoethyl ether of diethylene glycol), monomethyl cellusolve maleate, mono-2-hydroxyethyl aconitate.

In place of 2-hydroxyethyl methacrylate (HEMA) there can be used 2-hydroxyethyl acrylate, 2-hydroxypropyl acrylate, 3-hydroxypropyl acrylate, 2-hydroxypropyl methacrylate and 3-hydroxypropyl methacrylate. There can also be employed hydroxy lower alkoxy lower alkyl acrylates and methacrylates such as hydroxyethoxyethyl acrylate (diethylene glycol monoacrylate), hydroxyethoxyethyl methacrylate, hydroxyethoxyethyl methacrylate, hydroxypropoxypropyl acrylate (dipropylene glycol monoacrylate) and hydroxypropoxypropyl methacrylate. Usually there are two to three carbon atoms in each alkoxy and alkyl group.

The hydroxyalkyl acrylate or methacrylate less preferably can also be replaced in whole or in part by vinyl pyrrolidone, acrylamide, methacrylamide, lower alkyl substituted acrylamides and methacrylamides such as N-propyl acrylamide, N-isopropyl methacrylamide, N-methylacrylamide and N-methylmethacrylamide, N-methylol acrylamide and N-methylol methacrylamide, N-2-hydroxyethyl acrylamide, N-2-hydroxyethyl methacrylamide and the polymer can contain vinyl alcohol unit. However, these monomers usually form water soluble homopolymers and hence they require the presence of a cross-linking agent or copolymerization with a sufficient amount of the hydroxyalkyl acrylates and methacrylates to render the copolymers water insoluble.

As mentioned the preferred monomer most useful for the preparation of these foamed structures is hydroxyethyl methacrylate homopolymerized or copolymerized with methacrylic acid. This polymerization is best carried out in the presence of water using any free radical catalyst.

While either homopolymers or copolymers can be employed in the preparation of these sponges it is more desirable to use cross-linked polymers.

The hydroxyethyl methacrylate monomer base may range from 100 percent (homopolymer) to 60 percent in the copolymer mixture. When methacrylic acid is the comonomer the level in the copolymer may range up to 40 percent. The preferred range for co-monomer mixture is 90–99 percent hydroxyethyl methacrylate, 2–4 percent methacrylic acid and 0.8 percent cross-linking agent. Usually the modifying monomers are between 0.1 and 20 percent of the total monomers.

Typical examples of cross-linking agent include ethylene gylcol diacrylate, ethylene glycol dimethacrylate, 1,4-butylene dimethacrylate, diethylene gylcol dimethacrylate, propylene glycol dimethacrylate, diethylene glycol diacrylate, dipropylene glycol diacrylate, divinyl benzene, divinyl toluene, diallyl tartrate, allyl pyruvate, allyl malate, divinyl tartrate, triallyl melamine, N,N'-methylene bisacrylamide, diallyl maleate, divinyl ether, diallyl monoethylene glycol citrate, diallyl itaconate, ethylene glycol diester of itaconic acid, divinyl sulfone, hexahydro-1,3,5-triacryltriazine, triallyl phosphite, diallyl ester of benzene phosphonic acid, polyester of maleic anhydride with triethylene glycol, diallyl aconitate, divinyl citraconate, diallyl fumarate, ammonium dichromate. The amount of cross-linking agent, if used can be 0.05 to 20 percent, usually not over 10 percent and preferably between 0.2 and 2 percent.

The above described monomeric system is admixed with pyrogen free water in which the catalyst is dissolved or suspended. The monomeric system is usually mixed with the water system so that the water may range from 35 to 95 percent of the mixture. Most preferably the mixture should be 30 percent by volume monomer(s) and the water catalyst system should be 70 percent by volume. Below 35 percent water a clear gel is obtained rather than the desired opaque gel.

Catalyst levels may range from 0.1 percent of 10 percent based on the weight of the monomer. Most preferably it should be 0.5 percent of the mix.

Examples of catalyst useful for the polymerization are 1,3-bis-(t-butylperoxyisopropyl) benzene, succinic acid peroxide, bis(1-hydroxycyclohexyl) peroxide, t-butyl-peroctoate, benzoyl peroxide, isopropyl percarbonate, methyl ethyl ketone peroxide, cumene hydroperoxide, and dicumyl peroxide. Another group of catalysts useful mainly for low temperature polymerization included redox systems such as potassium persulfate-riboflavine, potassium persulfate-sodium bisulfite, hydrogen peroxide-divalent iron. Various compounds such as N, N,N',N'-tetramethylethylenediamine can be used to accelerate the effect of the catalysts. Irradiation, e.g., by ultraviolet light or gamma rays can also be employed to catalyze the polymerization.

Various water soluble salts may be included in the aqueous monomeric solution at concentrations from 1 to 19 percent of the aqueous fraction. These salts are usually dissolved in the water prior to mixing with the monomers, e.g., salts such as chlorides of sodium, calcium, potassium and ammonium, acetates or citrates of ammonium, sodium and potassium may be employed, Salts such as potassium, sodium or ammonium persulfate are particularly useful because in their presence no additional catalyst system is required in order to carry out the polymerization.

Polymerizations can be carried out by placing said water-monomer mixture in a mold in an oven maintained at 40°–130° C., the most preferred temperature being 70°C., and curing for 15 minutes to 1.5 hours, the most preferred time being 1 hour. As previously indicated, however, polymerization can be carried out at lower temperatures, e.g., 5°C.

The resulting sponge is then water washed and assayed until free of any residual materials.

These sponge materials may be polymerized or laminated to, or coated by various moisture vapor transmission polymers such as vinyl acetate polymers, elastomeric silicone polymers, e.g., dimethyl siloxane polymers, polybutylenes, polyisoprene, polybutadiene, microporous polyethylene, microporous polypropylene, polymers of alkoxy acrylates, or methacrylates, and of alkyl acrylates of methacrylates, and mixtures of these, copolymers of alkyl and alkoxy acrylates and methacrylates.

As alkoxyalkyl acrylate and methacrylate polymers, there can be used polymers of methoxyethyl acrylate, methoxyethyl methacrylate ethoxyethyl acrylate, ethoxyethyl methacrylate, propoxyethyl acrylate, propoxyethyl methacrylate, butoxyethyl acrylate, butoxyethyl methacrylate, methoxypropyl acrylate, ethoxypropyl methacrylate. When such lower alkoxy lower alkyl acrylates and methacrylates are copolymerized with other monomers, e.g. to reduce the rate of moisture loss, there can be used 0.1 to 50 percent, usually not over 20 percent of the other monomer. Such other monomers include vinyl acetate, vinyl butyrate, vinyl chloride, styrene, alpha methyl styrene, alkyl acrylates and methacrylates such as methyl acrylate, ethyl acrylate, butyl acrylate, 2-ethylhexyl acrylate, methyl methacrylate and butyl methacrylate.

The preferred nonhydrophilic moisture vapor permeable and oxygen and carbon dioxide permeable polymers for the outer coatings are those shown in Hodgson U.S. Pat. No. 3,645,835, which are water insoluble. The entire disclosure of Hodgson is hereby incorporated by reference. It will be observed that the non hydrophilic moisture vapor permeable polymers in Hodgson have a permeability for water vapor of at least 300 g/sq.m/24 hrs/40° C/80 percent R.H. with 500 g. being preferred for wound dressings.

Examples of suitable non-hydrophilic polymers water vapor permeable polymers set forth in Hodgson include poly(vinyl ethyl ether) such as Bakelite EHBM having a reduced viscosity at 20° C. of 4.0 ± 0.5 and Bakelite EDBC having a reduced viscosity at 20° C. of 0.3 ± 0.1, polymers of ethoxyethyl acrylate, ethoxyethyl methacrylate, methoxyethyl acrylate and methoxyethyl methacrylate, copolymers of methoxyethyl methacrylate with ethoxyethyl methacrylate (e.g. 50:50, 60:40 and 70:30 by volume), copolymers of ethoxyethyl methacrylate and methyl methacrylate (e.g. 80:20 by volume).

The most preferred polymer useful as the outer coating of the sponge layer is a copolymer of methoxyethyl methacrylate and ethoxyethyl methacrylate (50:50 by volume having an oxygen permeability of 5,000 ml/sq.m/24 hrs/1 atm./mil and is the copolymer of example 10 of Hodgson patent. At a thickness of 2.1 mil it had a mositure vapor permeability g/sq.m/24 hrs at 40° C. and 80 percent RH of 1,800, a 70:30 by volume copolymer of the same monomers had a value of 1,650 at a thickness of 2.7 mil. Other typical moisture vapor permeabilities defined in the same way are for the following polymers:

| | |
|---|---|
| ethoxyethyl methacrylate polymer | 880 at 4.5 mils |
| ethoxyethyl methacrylate-hydroxyethyl ethyl methacrylate (80:20 by volume) | 1400 at 2.5 mils |
| ethoxyethyl methacrylate-methyl methacrylate (80:20 by volume) | 1020 at 2.5 mils |
| methoxyethyl methacrylate | 1140 at 4.3 mils |
| methoxyethyl methacrylate-methyl methacrylate (90:10 by volume) | 1650 at 2.0 mils |
| methoxyethyl methacrylate-hydroxyethyl methacrylate (90:10 by volume) | 2460 at 1.5 mils |

In employing the preferred MEA-EEA copolymer for the outer coating, it is usually employed in a 10–70 solution in ethanol. A thin layer of the solution is deposited on the surface of hydrophilic polymer sponge by any appropriate method such as solution casting, spraying or brush application followed by rapid removal of the solvent, e.g. by air drying. The particular solvent employed is not critical and any solvent for the outer coating can be employed. Alternatively as indicated the outer coating can be adhered to the sponge by any convenient adhesive, e.g. Adhesive A, B, C, D or E of Hodgson. A preferred adhesive is made up of 50 parts Bakelite EHBM, 50 parts of Bakelite EDBC, 25 parts of Kelrez ZR142 (zinc resinate) dissolved in 300 mils of 60–80 petroleum ether. There can also be included, if desired, 3 parts of an antioxidant, e.g. Nonex WSL.

The HEMA or other monomer forming a hydrophilic sponge polymer can also be polymerized on the film which forms the outer coating.

While the outer coating is non hydrophilic it can contain up to 30 percent of a hydroxy lower alkyl acrylate or methacrylate, e.g. HEMA, preferably not over 20 percent by volume when in admixture with an alkoxyalkyl acrylate or methacrylate. With such low amounts of HEMA or the like the outer coating is not affected by water, i.e., it does not swell significantly therein.

The invention will be understood best in connection with the drawings wherein the single FIGURE discloses in cross-section an artificial skin 2 composed of a relatively thick, water insoluble hydrophilic polymer sponge layer 4 and a relatively thin non hydrophilic water vapor permeable, oxygen and carbon dioxide permeable polymer outer coating film 6.

Unless otherwise indicated all parts and percentages are by weight.

EXAMPLE 1

A hydrophilic sponge, 1.5 mm thick was prepared by mixing together 70 parts of an aqueous solution of 0.5 percent ammonium persulfate with 30 parts of the monomer hydroxyethyl methacrylate containing 0.8 percent ethylene dimethacrylate as the cross-linking agent. This solution was placed between glass plates and cured for 1 hour at 70° C. The resulting sponge was then removed from the mold and water leached free from excess salts.

EXAMPLE 2

Example 1 was repeated using isopropyl percarbonate as the catalyst.

EXAMPLE 3

Example 1 was repeated using a Dacron mesh as reinforcement in the center of mold to produce a sponge having a fibrous reinforcement.

EXAMPLE 4

A hydrophilic sponge was prepared by mixing together 30 parts of hydroxyethyl methacrylate containing 0.8 percent by weight of the cross-linker N,N-methylene bisacrylamide, with 70 parts of an aqueous solution containing 80 percent by weight of ammonium chloride. 0.5 parts of potassium persulfate were dissolved in the aqueous mixture, followed by the addition of 0.5 parts of sodium bisulfite. This mixture was poured into a mold as described in Example 1, and cured in a water bath at 35° C for 1 hour, and then leached as in Example 1.

The above examples are merely illustrative of typical preparation of sponges suitable for use in the present invention. There can also be employed sponges prepared by Wichterle U.S. Pat. No. 3,220,960 the entire disclosure of which is incorporated by reference, or Wichterle U.S. Pat. No. 2,976,576. Both of the Wichterle patents call their products hydrogels.

EXAMPLE 5

As in Example 1, but monomer was adjusted to contain 2.4 percent methacrylic acid.

EXAMPLE 6

The procedure of Example 5 was repeated using polypropylene mesh as a reinforcement in center of sponge.

EXAMPLE 7

The sponge from Example 1 was top coated by spraying a 20 percent ethyl alcohol solution of the copolymer ethoxyethyl methacrylate — methoxyethyl methacrylate (50:50 by volume) to result in a film thickness of 1.5 mils on top of the sponge.

EXAMPLE 8

The product of Example 7 was cut to approximately 2.1 mm thick and 1 cm in diameter. After sterilization in an autoclave the device was placed into the subcutaneous space, in the abdominal wall of anesthetized rats. Examination after 21 days shows the sponge to be firmly adhered to the abdominal wall. Cross section of the sponge at 65X showed that connective tissue was extended well into the sponge and no inflamation response was seen. Further examination showed moderate amount of collagen, blend foreign body response and more conspicious capillaries than are usually seen about sponge body responses.

In place of the sponge from example 1 there can be used in example 7 the sponges prepared in any of examples 2,3,4,5 and 6. In example 7 the EEA-MEA copolymer can be from 70:30 to 30:70 by volume, for example, or even can be used as a homopolymer.

What is claimed is:

1. An artificial skin consisting essentially of (1) a relatively thick water-containing hydrophilic polymer hydrogel sponge layer and (2) on one side of said sponge layer a relatively thin film layer of non hydrophilic moisture vapor permeable, oxygen and carbon dioxide permeable polymer, said layers (1) and (2) combined have a moisture vapor transmission of 200–5,000 grams/sq. meter/24 hours/40° C./80 percent relative humidity/mil. and said hydrophilic polymer being a polymer of a member of the group consisting of hydroxy lower alkyl acrylates, hydroxy lower alkyl methacrylates, hydroxy lower alkoxy lower alkylacrylates, hydroxy lower alkoxy lower alkyl methacrylates, vinyl pyrrolidone, acrylamide, lower alkyl methacrylamide, N-hydroxy lower alkyl acrylamide, N-hydroxy lower alkyl methacrylamide and polyvinyl alcohol.

2. An artificial skin according to claim 1 wherein the thin layer (2) is a polymer of a lower alkoxy lower alkyl acrylate, a polymer of a lower alkoxy lower alkyl methacrylate, a vinyl acetate polymer, elastomeric silicone, polybutylene, polyisoprene, polybutadiene, microporous polypropylene or microporous polyethylene.

3. An artificial skin according to claim 1 wherein said combined layers have oxygen and carbon dioxide transmissions of 500 to 6,000 ml/sq.meter/24 hours/40° C./1 atm/mil.

4. An artificial skin according to claim 1 wherein the polymer of said hydrophilic sponge layer is a polymer of a member of the group consisting of hydroxy lower alkyl acrylates, hydroxy lower alkyl methacrylates, hydroxy lower alkoxy lower alkyl acrylates and hydroxy lower alkoxy lower alkyl methacrylates.

5. An artificial skin according to claim 4 wherein the sponge layer (1) is at least 10 times the thickness of the thin film layer (2).

6. An artificial skin according to claim 4 wherein the sponge layer (1) is a polymer of a hydroxyalkyl acrylate or hydroxyalkyl methacrylate having two to three carbon atoms in the alkyl group.

7. An artificial skin according to claim 6 wherein the thin layer (2) is a polymer of a lower alkoxy lower alkyl acrylate or a polymer of a lower alkoxy lower alkyl methacrylate.

8. An artificial skin according to claim 7 wherein the alkoxy group has one to four carbon atoms and the alkyl group has two to three carbon atoms.

9. An artificial skin according to claim 7 wherein the thin layer (2) is a copolymer of methoxyethyl methacrylate and ethoxyethyl methacrylate.

10. An aritficial skin according to claim 4 wherein the sponge is swollen to an extent of at least 10 percent with water over the thickness of the layer when in dry condition.

11. An artificial skin according to claim 10 wherein the sponge layer (1) has a thickness of 25 to 50 mils and the non hydrophilic thin layer (2) has a thickness of 0.5 to 2.5 mils.

12. An artificial skin according to claim 4 wherein the sponge layer (1) is 35 to 95 percent water and the balance is hydrophilic polymer.

13. An artificial skin according to claim 12 having a moisture vapor transmission of at least 300 grams/sq.m./24 hours/40° C./80 percent relative humidity/mil and oxygen and carbon dioxide transmissions of not over 3,000 ml/sq.m./24 hrs./40° C.atm/mil.

14. An artificial skin according to claim 12 having a fibrous reinforcement in at least one of said layers (1) and (2).

15. An artificial skin according to claim 2 having fibrous reinforcement in the sponge area.

16. An artificial skin according to claim 2 consisting of (1) the relatively thick water containing hydrophilic hydroxyethyl methacrylate sponge layer and (2) on one side of said sponge layer the relatively thin film layer of a non-hydrophilic moisture vapor permeable, oxygen and carbon dioxide permeable polymer of a lower alkoxy lower alkyl acrylate or methacrylate.

* * * * *